March 18, 1969   L. H. LEONARD, JR   3,433,296
HEATING AND COOLING SYSTEM
Original Filed June 23, 1964   Sheet 3 of 3

INVENTOR.
LOUIS H. LEONARD, JR.
BY
ATTORNEY.

United States Patent Office 3,433,296
Patented Mar. 18, 1969

3,433,296
HEATING AND COOLING SYSTEM
Louis H. Leonard, Jr., De Witt, N.Y., assignor to Carrier Corporation, Syracuse, N.Y., a corporation of Delaware
Application May 23, 1966, Ser. No. 552,257, now Patent No. 3,389,747, dated June 25, 1968, which in turn is a division of application Ser. No. 377,314, June 23, 1964, now Patent No. 3,289,745. Divided and this application Aug. 28, 1967, Ser. No. 663,810
U.S. Cl. 165—39                                      1 Claim
Int. Cl. F25b 29/00

ABSTRACT OF THE DISCLOSURE

A heat exchanger for circulating heating medium for heating a load. The heating medium is heated by steam. A trough surrounds a tube bundle and contains water about the tube bundle for regulating the heating capacity of the tube bundle. The amount of water is varied to regulate the heating capacity of the heat exchanger.

---

This application is a division of my copending divisional application Ser. No. 552,257, filed May 23, 1966, now Patent No. 3,389,747, said application Ser. No. 552,257 being a division of application Ser. No. 377,314, filed June 23, 1964, now Patent No. 3,298,745, entitled, "Heating and Cooling System," and relates to a heating and cooling system and, more particularly, to a heat exchanger for heating a load and to heating and cooling capacity control in such a system.

Various types of refrigeration systems, such as absorption systems and refrigerant compressor systems, are well known in the art. The construction, components and relative association of the components, as well as the operating characterisitcs of such systems are also well known. However, each system has certain disadvantages as well as particular advantages, but attempts to provide systems combining the advantages of accepted systems while avoiding their disadvantages have generally resulted in systems which were impractical.

For example, various expedients are known in the art for automatically controlling the capacity of the various systems. In systems utilizing a refrigerant compressor, such control is usually accomplished by varying the compressor speed or adjusting guide vanes in the compressor inlet to regulate the flow of refrigerant. My United States Patent No. 3,288,203 entitled "Heating and Cooling System," more fully discusses such prior systems and discloses a system wherein one condensing bundle in a steam condenser is blanketed with a noncondensible refrigerant vapor to control the cooling capacity of the system while another condensing tube bundle in the steam condenser remains effectively free of such blanketing for providing optimum heating for a load to be heated. During winter heating operation, when cooling is not required, a purge system is kept in operation to maintain the heating bundle free of any refrigerant which may migrate into the steam condenser.

Refrigerant systems which utilize a high speed centrifugal compressor and a relatively high molecular weight refrigerant are known to possess many theoretical advantages in size, cost and efficiency as is more fully discussed in my prior copending United States patent application, Ser. No. 112,679, filed May 25, 1961, for a "Method and Apparatus for Heating and Cooling." However, practical problems affect the life and reliability of many such systems and these problems have greatly increased the cost and complexity of the systems, so that early systems of this type have received little general acceptance.

In three-pipe air conditioning installations, both cooling water and heating water are piped throughout the installation so that air circulating within the various areas can be regulated independently to a desired temperature. As is generally understood, when the cooling demand throughout the installation is high, the cooling capacity of the system should greatly exceed the heating capacity, and under reverse conditions, the heating capacity should greatly exceed the cooling capacity of the system. To vary the heating and cooling capacities of a system inversely of each other, as is desirable in a typical three-pipe system, has required complicated and expensive controls, and many machines used for simultaneous heating and cooling are too delicate and easily become inoperative should leakage occur. Furthermore, prior machines have generally been unable to efficiently provide high heating capacity at low or zero cooling capacity while maintaining the system in normal heating operation.

A primary object of this invention is to provide a new and improved heating and cooling system.

A further object is provision of a new and improved heating machine. A related object is provision of such a machine, which is operated by steam for satisfying a demand in addition to heating, for preventing the heating requirement from utilizing the steam required to satisfy the other demand.

A further object is provision of a new and improved heat exchanger. A related object is provision of such a heat exchanger in a machine for providing heating and cooling.

A still further object is provision of a new and improved heating and cooling machine for varying the heating capacity inversely in the cooling capacity of the machine. A related object is provision of such a machine which is particularly suited for use in a three-pipe heating and cooling system.

A still further object is provision in a heating and coolnig machine of new and improved means for controlling the heating capacity inversely of the cooling capacity.

These and other objects of the invention will be apparent from the following description and the accompanying drawings in which.

The invention is illustrated in the form of apparatus for providing cooling, heating and simultaneous heating and cooling. The system is preferably airtight and may be considered as having power side including a circuit for the circulation of a power fluid, and a refrigerant side including a circuit for the flow of a refrigerant fluid under the influence of drive or operating means on the power side driven by the power fluid, with the operation of the apparatus regulated by a control system.

The invention will be described with reference to a preferred power fluid, which is water, and a preferred refrigerant which is octafluorocyclobutane, commonly referred to as C318 and having a chemical formula $C_4F_8$. These fluids are particularly preferred because of their relative immiscibility and because they are inherently highly stable and do not tend to decompose or chemically react with each other or other materials in the system, or cause or promote corrosion and undersirable byproducts. Also, this refrigerant is a relatively noncondensible vapor at the temperatures and pressure at which the power fluid (water) condenses as well as at the usual ambient atmospheric conditions of temperature and pressure. However, other power fluids and refrigerants having the desired chemical and physical properties may be utilized within the scope of this invention.

Figure 1:
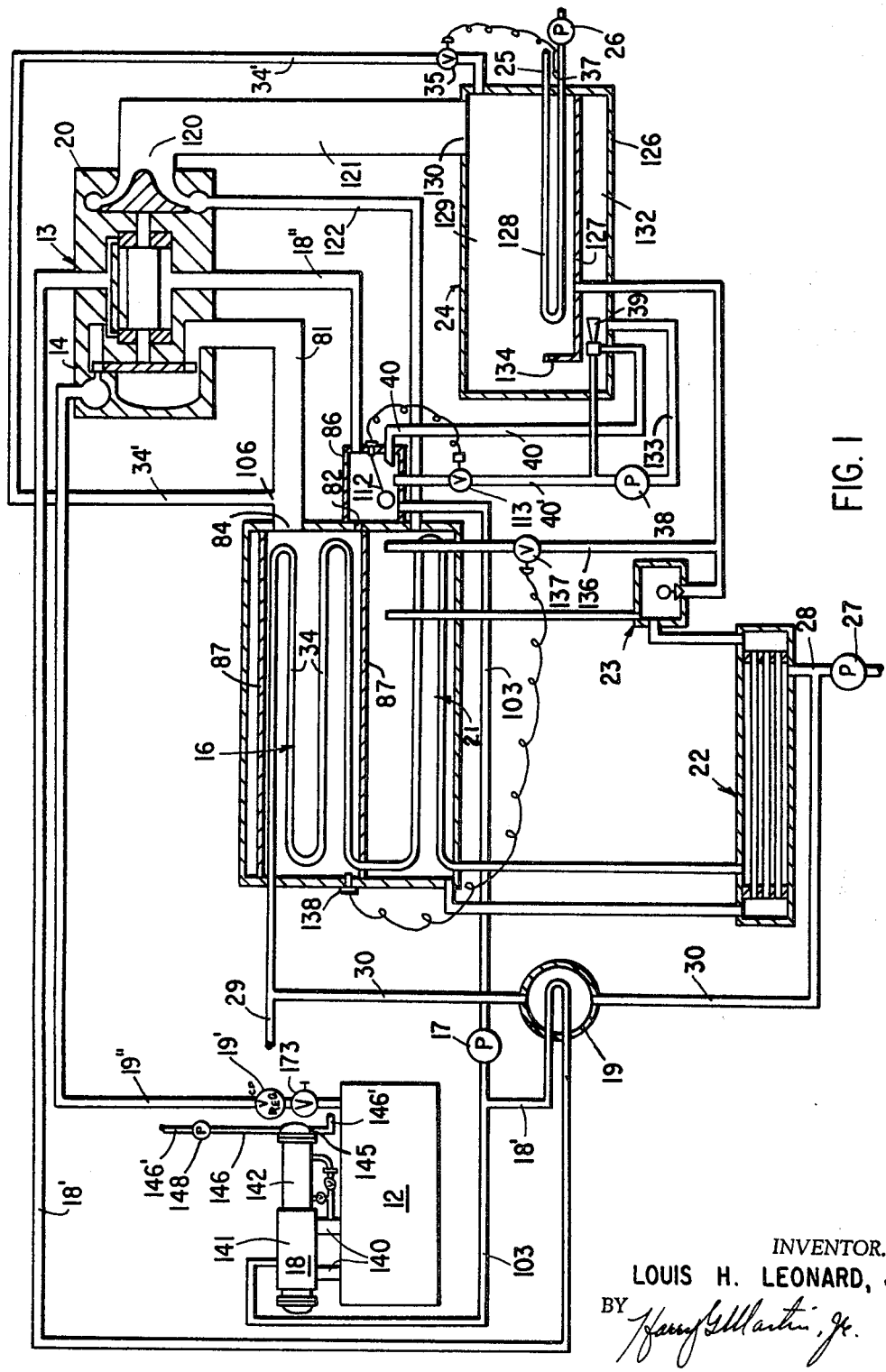
FIGURE 1 is a flow diagram of an embodiment of a heating and cooling machine.

As illustrated in FIGURE 1, the power side includes a suitable steam generator 12 and operating means in the form of a turbocompressor 13 including a turbine 14 which receives steam from the steam generator 12 and discharges exhaust steam to a steam condenser 16 here shown as part of a composite condensing unit as described in the copending patent application of Joseph Embury for a "Heat Exchanger Unit," Ser. No. 377,261, and filed on the same date as the present application. A steam condensate pump 17 returns the steam condensate from a steam condenser 16 through a heat exchanger 18 for providing heating to a load, from which the condensate passes to the steam generator 12 for recirculation through the power side of the system. The turbocompressor 13 preferably has water lubricated bearings and the steam condensate pump 17 forwards steam condensate through a lubricant line 18' including a lubricant cooling heat exchanger 19 for lubricating these bearings. Leakage of steam and refrigerant between the turbine and the compressor, and the lubricating water, pass through a drain line 18" to the steam condenser 16. In the illustrated apparatus the steam generator 12 supplies steam at a substantially constant pressure (15 p.s.i.g., for example) controlled for example, by a constant pressure regulating valve 19' in a steam supply line 19" to the turbine.

The refrigerant side of the system includes a refrigerant compressor 20 of the turbocompressor 13. The compressor 20 is drivingly connected with the turbine 14 for passing compressed refrigerant vapor to a refrigerant condenser 21 here shown as part of the composite condensing unit, although a separate structure may be employed if desired to condense the refrigerant. Condensed refrigerant passes from the refrigerant condenser 21 to a refrigerant subcooler 22 and through a suitable refrigerant flow restricting means 23 into an evaporator or cooler 24, from which the refrigerant vapor is withdrawn by the refrigerant compressor, thus completing the refrigerant circuit of the system. A chilled water line 25 extends into the cooler and carries a heat exchange medium, here in the form of chilled water, which is cooled by the refrigerant and circulated by means of a chilled water pump 26 to an area having a cooling requirement. The cooling capacity of the system varies in proportion to the compressor output.

A cooling tower or condensing water pump 27 circulates tower water through an inlet line 28 to the refrigerant subcooler 22 and through a condensing tube bundle 22' in the refrigerant condenser 21 and then the steam condenser 16 and back to the tower through an outlet line 29. A branch line 30 in the condensing water inlet line 28 provides tower water to the lubricant water heat exchanger 19 for cooling the lubricant water, and this branch terminates in the return line 29 to the tower. In general, control of condensing water temperature and flow rate is unnecessary, thus effectively minimizing scaling of condensing surfaces in the condenser due to average lower temperatures.

The control system regulates the cooling capacity of the machine by varying the steam condenser pressure as determined by the condensing rate of steam discharged into the steam condenser. The condensing rate of the steam condenser is regulated by controlled blanketing of a tube bundle 34 (which receives the tower water from the refrigerant condenser) with a noncondensible vapor, herein refrigerant vapor, introduced through a refrigerant line 34' from the cooler 24.

The quantity of noncondensible vapor effectively blanketing the tube bundle 34 of the steam condenser is regulated by a modulating refrigerant valve 35 in the line 34'. The valve 35 is actuated responsive to chilled water temperature by means of a temperature sensor 37 on the chilled water line 25 so that as the cooling load drops more refrigerant is introduced into the steam condenser 16 thus reducing the steam condensing rate to increase the steam condenser pressure, and therefore the temperature of the saturated steam and the turbine discharge pressure to reduce the turbocompressor output and in general speed. The refrigerant is preferably withdrawn from the steam condenser at a constant rate, and herein a constant speed water supply pump 38 circulates impeller water for operating a jet pump 39 which withdraws the noncondensible vapor from the stream condenser 16 through a purge line 40 opening into the throat of the jet pump. Impeller water temperature is maintained below the saturation temperature of water in the steam condenser to prevent water from flashing in the jet pump 39, and to this end, the hot vapors withdrawn from the steam condenser are cooled in the cooler 24. The water supply pump 38 further provides make-up water for the steam generator 12 through a make-up water line 40' to the steam condenser 16.

More particularly, after passing the turbine rotor, the steam is saturated and passes through a turbine steam discharge passage 81 and into the steam condenser 16. The turbocompressor 13 is suitably mounted on an end plate 82 of the steam condenser, as by bolts, with the turbine discharge passage 81 in communication with a steam inlet port 84 in the end plate. A condensate chamber 86 of the steam condenser 16 is in communication with the interior of a cylindrical shell 87 of the steam condenser 16 through a port 88 in the end wall plate 82. The turbocompressor drain 18" opens into the condensate chamber 86. The steam condensate pump 17 withdraws the steam condensate from the condensate chamber through a condensate line 103 and pumps the condensate back to the heat exchanger 18.

The refrigerant injected into the steam condenser to blanket the tube bundle 34 passes through a refrigerant port 106 in the end of the refrigerant line 34' at the steam condenser steam inlet port 84. The refrigerant vapor entering the steam condenser 16 envelops the tube bundle 34 thereby insulating the tubes to reduce the steam condensing capacity and raise the pressure. The rate of condensing steam in the steam condenser is proportional to the cooling capacity of the system so that the flow rate of the condensate to the heat exchanger 18 is similarly proportional.

The purge line 40 opens into a side of the steam condensate chamber 86 at a level to withdraw steam condensate from the chamber should the condensate level rise too high. Responsive to a low condensate level in the condensate chamber 86, a float actuated sensor 112 opens a normally closed shut-off valve 113 in the make-up water line 40' from the water supply pump 38, to maintain a minimum level of condensate in the chamber 86.

The cooler refrigerant inlet opens into a refrigerant pan 127 spaced above the bottom of the cooler shell 126. A U-tube bundle 128 of the chilled water line 25 is within the refrigerant pan 127 so that during normal cooling operation, the tubes are flooded by boiling refrigerant. As the refrigerant evaporates, the vapor passes into a refrigerant chamber 129 in an upper portion of the cooler shell 126 above the pan. A refrigerant outlet 130 opens into an upper portion of the refrigerant chamber 129 and is connected with the compressor inlet 120 by the suction line 121. The portion of the cooler 24 below the refrigerant pan 127 provides a water sump 132 which contains the jet pump 39 so that the impeller water and refrigerant and any water vapors purged from the steam condenser 16 are injected into the sump 132 and sump water is withdrawn from the sump through a pump supply line 133 so that the sump water is recirculated through the sump. During normal cooling operation, refrigerant in the sump is a vapor which passes upwardly about the left end of the refrigerant pan 127 and into the refrigerant chamber 129 from which it is withdrawn through the suction line 121. Water in the refrigerant chamber 129 collects on top of the liquid refrigerant in the pan 127. The chilled water tube bundle 128 is spaced inwardly from the left end wall of the pan to form a relatively quiet area of liquid refrigerant upon which any water in the pan collects in a relatively quiet pool and flows through a suitable weir or port 134 in the end of the pan and into the sump 132. Thus, means is provided for separating refrigerant fluid and power fluid, and for returning these fluids for reuse in the system.

A hot gas bypass including a hot gas bypass line 136 having a modulating refrigerant valve 137 with a sensor 138 responsive to total pressure in the steam condenser 16 is provided to increase the useful heating capacity range at low or zero cooling capacity, as is more fully discussed in my previously mentioned "Heating and Cooling System" application.

To summarize the cooling operation of the machine, if the chilled water temperature drops, indicating a reduced cooling requirement, the modulating refrigerant valve 35 in the refrigerant line 34' to the steam condenser 16 is opened additionally to permit more refrigerant to enter the steam condenser for blanketing the first condensing bundle 34 to reduce the steam condensing capacity and to increase steam condenser pressure and the turbine discharge pressure, thus slowing the turbocompressor and causing the compressor 20 to deliver a smaller quantity of refrigerant to the cooler 24, thereby reducing the cooling capacity of the system and increasing the temperature of the leaving chilled water. Should the chilled water temperature rise, indicating a rise in the cooling requirement, the refrigerant valve 35 is closed sufficiently and less refrigerant is injected into the steam condenser so that the quantity of refrigerant vapor effectively blanketing the condensing bundle 34 is reduced as the constant rate purge withdraws refrigerant from the steam condenser, thus increasing the cooling capacity.

Figure 2:
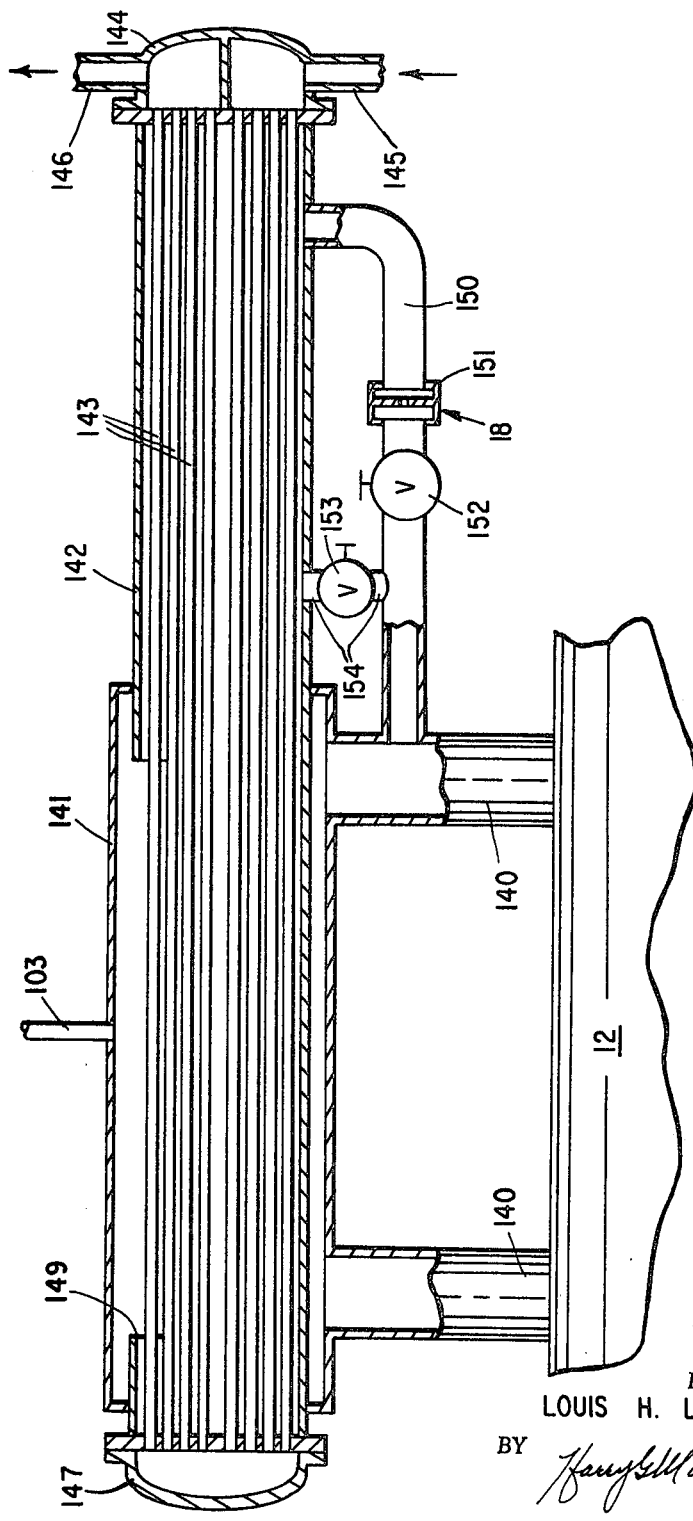
FIGURE 2 is an axial vertical sectional view of a heat exchanger of the machine shown in FIGURE 1, with parts broken away for clearer illustration.

With reference to FIGURE 2, the heat exchanger 18 is surmounted on the steam generator 12 by means of a pair of vertical supporting pipes 140 opening into the steam generator and a cylindrical steam jacket 141. The jacket 141 is secured in fluid tight manner about a left end of a cylindrical shell 142. The shell encases a straight through tube bundle 143 opening at one end into a suitable header 144 having an inlet 145 and an outlet 146 for circulating a heating medium, preferably water, through a heating line 146' and the tube bundle, and at an opposite end opening into a return header 147 at the opposite end of the shell 142. Alternatively, a U-tube bundle and only an inlet-outlet header may be provided. A heating water pump 148 in the line 146' circulates the heating water to a load having a heating requirement.

The steam condensate return line 103 from the steam condensate pump 17 opens through the jacket 141 for discharging steam condensate from the steam condenser 16 through an open top portion 149 of the shell 142 which forms a container for the condensate.

During normal partial load operation of the heating and cooling machine, the tube bundle 143 is at least partially covered by the condensate for reducing heat transfer from the steam to the bundle, thereby reducing the heating capacity of the system and insuring sufficient steam for the cooling cycle requirements. Both the condensate from the steam entering directly from the steam generator 12 through the supporting pipes 140 for heating the water within the tube bundle 143, and the condensate from the steam condenser 16 entering through the steam condensate return line 103, are returned to the steam generator 12 through a condensate return conduit 150 communicating with a lower portion of the shell 142 and opening into one of the supporting pipes 140. A restricting orifice 151 is provided in the condensate return conduit 150 for restricting the flow of condensate back to the steam generator 12 via that route. The orifice 151 is of such size and at such a position below the bottom of the open top portion 149 of the shell 142 so that at full cooling capacity, the steam condenste barely overflows through the open top 149 and the head of condensate above the orifice causes full condensate flow, corresponding to full boiler capacity (for example 1000 pounds of steam or condensate per hour), through the orifice 151 by gravity. As the cooling capacity drops, the flow rate of steam condensate into the shell 142 drops proportionally, so that the head of condensate in the shell 142 also drops to an equilibrium level at which the flow rate through the orifice 151 equals the flow rate of condensate through the return line 103 and the rate at which the steam heating the tube bundle 143 condenses in the shell 142. About ten per cent of the tubes of the heating bundle 143 are preferably above the top possible level of the covering condensate in the shell 142, that is, above the elevation of the bottom of the open top portion 149 of the shell 142, so that some heat is always provided to the load.

Thus, for any given flow rate of condensate from the steam condenser through the steam condensate return line 103, a given level of condensate is maintained within the shell 142 for partially covering the tube bundle 143 and thereby regulating the maximum amount of heat transferred between the steam and the heating water to the load. For example, with full cooling, the pressure drop across the orifice will be enough to submerge the tube bundle almost to the top, so that only the top tubes are available for heating.

A manually operable shut-off valve 152 may also be provided in the return conduit 150 to render the orifice 151 inoperative for regulating the passage of condensate from the shell 142 to the steam generator 12, and a manually operable regulating valve 153 may be provided in a second return conduit 154 from the shell 142 to the pipe 150 for manually regulating the condensate level in the shell 142.

It should be noted that a closed steam circuit is provided in the heating and cooling machine so that make-up water need not be added to the system and boiler water treatment is not required. A steam generator water level control may be provided for regulating the flow of steam condensate through the steam condensate return line 103, and thus prevent an excessive accumulation of water in the steam generator under unusual circumstances, but under normal operating condition such a control does not affect the rate at which condensate is formed in the steam condenser 16 and passed to the heat exchanger 18.

Figure 3:
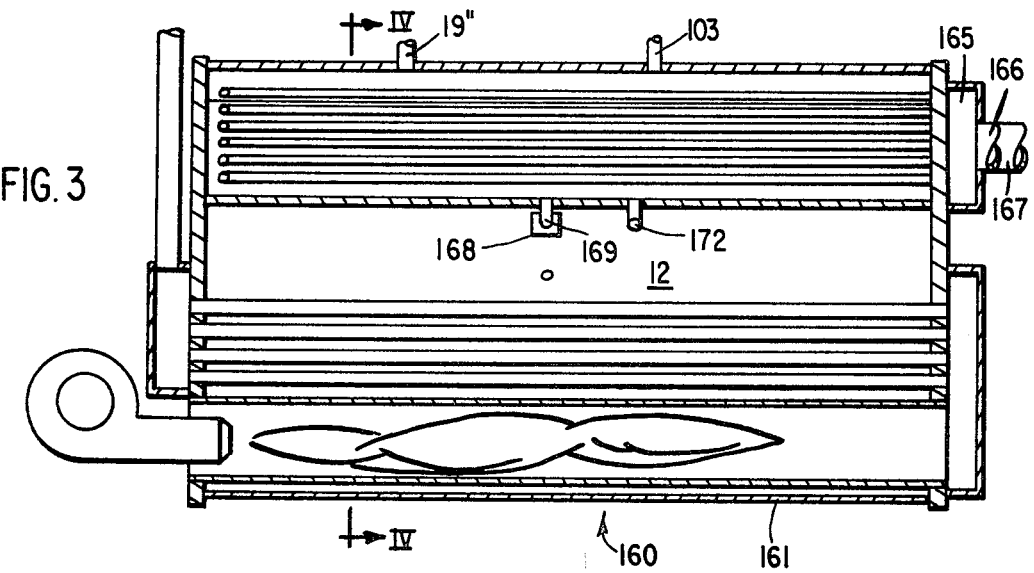
FIGURE 3 is a vertical sectional view of another embodiment of a heat exchanger incorporated within a steam generator of the machine, and taken generally on the line III—III in FIGURE 4.
Figure 4:
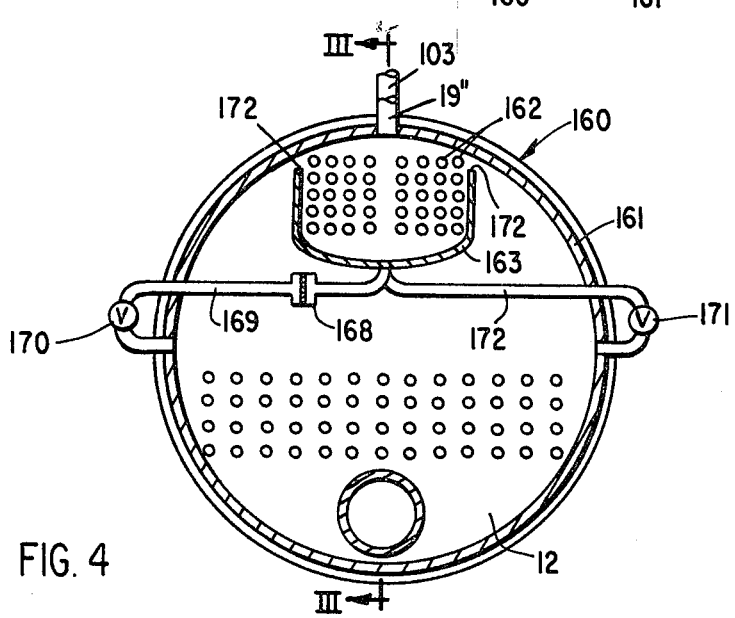
FIGURE 4 is a vertical sectional view taken generally along the line IV–IV in FIGURE 3.

Another embodiment of a heat exchanger 160 is shown in FIGURES 3 and 4, and is substantially the same as the previously described heat exchanger 18 except as follows: The heat exchanger 160 is within a shell 161 of the steam generator 12 which may be of any suitable fire tube type. The heat exchanger 160 includes a tube bundle 162 in lieu of the tube bundle 143, and a trough 163 in lieu of the shell 142. The tube bundle may be straight through tubes opening into opposed headers of the steam generator, or, as shown, U-tubes opening into a header, as 165, in suitable communication with an inlet 166 and an outlet 167 for the heating line 146'. The trough 163 is in sealed engagement with the header 165 and an opposed plate, for containing steam condensate entering through the steam condensate return line 103, and condensed in the trough 163, as previously described. Herein the line 103 extends through the steam condenser shell 161 and opens above the trough 163. A restricting orifice 168 is provided in a first condensate return conduit 169 at the bottom of the trough 163, in lieu of the orifice 151 in the prior embodiment, and a manually operable shut-off valve 170 may be provided in the return conduit 169 to render the orifice inoperative so that heating capacity may be regulated by a manually operable regulating valve 171 in a second return conduit 172 providing communication between the bottom of the trough 163 and the body of water within the steam generator 12, all as previously described. The valves 170 and 171 are outside of the shell of the steam generator.

About ten percent of the tube bundle 162 is above top edges 172' of the trough 163 to provide some heating at full cooling capacity.

The heat exchangers herein described effectively eliminate water hammer and, during winter heating when cooling is not required, a shutoff valve 173 (FIGURE 1) in the steam line 19" to the turbine 14 may be closed. The steam condensate pump 17 and the water supply pump 38 remain in operation for purging refrigerant from, and providing adequate water for the steam generator 12.

While a preferred embodiment of the invention has been described and illustrated, it will be understood that the invention is not limited thereto since it may be otherwise embodied within the scope of the following claim.

I claim:
1. A heat exchanger comprising, a tube bundle for circulating a heating medium to be heated by steam for heating a load, a shell enveloping said tube bundle for containing water about the tube bundle, said shell having an upper portion with an opening below a limited portion of said tube bundle for the overflow of said water and for permitting some heating of said heating medium when said shell is filled with water to overflowing, a jacket about said shell at said opening for receiving steam to heat the bundle and for receiving water overflowing from said shell, conduit means for passing steam into said jacket and removing water from said jacket, means for passing water into said shell, means providing a water outlet in a lower portion of said shell, and means in said outlet for regulating the amount of water in said shell that covers said tube bundle to regulate the heating capacity of the heat exchanger.

References Cited
UNITED STATES PATENTS

| | | | |
|---|---|---|---|
| 447,396 | 3/1891 | Worthington | 165—101 |
| 2,254,389 | 9/1941 | Olcott | 165—39 |

ROBERT A. O'LEARY, *Primary Examiner.*

C. SUKALO, *Assistant Examiner.*